Patented Feb. 4, 1930

1,745,926

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

RUBBER COMPOSITION AND METHOD OF MAKING THE SAME

No Drawing. Application filed November 2, 1925. Serial No. 66,396.

This invention relates to rubber compositions and has for an object to produce relatively inexpensive thermoplastic derivatives of rubber. A further object of my invention is to provide an improved method for utilizing vulcanized scrap rubber, such as factory trimmings, defective articles, or reclaimed rubber, in the production of these thermoplastic compositions.

Heretofore, there has been a considerable waste in the manufacture of rubber goods by reason of the relatively large amount of vulcanized scrap rubber formed incidental to the manufacturing operations, which scrap, either reclaimed or comminuted, has been largely used as substitutes for inexpensive pigments, particularly in the manufacture of low grade articles, with a consequent result that neither vulcanized rubber scrap nor reclaimed rubber has at present a high market value.

I have found that vulcanized scrap rubber and reclaimed rubber may be used in the preparation of relatively high grade moldable, thermoplastic compositions by reacting on such rubbers under certain conditions with organic sulfonyl chlorides. Further, I have found that I can facilitate the manufacturing operations by mixing with ground rubber scrap varying amounts of crude rubber or of rubber softeners, or of both crude rubber and softeners, these materials serving to hold the ground scrap in a coherent mass and assisting in the dispersion of the acid reagents therethrough. While the admixture of the ground scrap with crude rubber or with rubber softeners is not absolutely essential to the process herein described, I find the dispersion of the reagent to be more uniform and the resulting product to be superior where such an admixture is employed, so that such addition to the comminuted scrap becomes highly desirable in the production of a commercial heat-plastic composition.

*Example I.*—In one embodiment of my invention, vulcanized scrap having a low pigment content is comminuted and 15 to 20 per cent by weight of the acid reagent thoroughly dispersed therethrough, preferably by mixing the reagent with the comminuted rubber on a rubber mill. This mixture is then heated at such temperature and for such time as to produce a vigorous exothermal reaction, and after cooling, is masticated on a warm rubber mill to homogenize it and preferably washed free of acid and other water-soluble impurities during that process. By way of example, proceed as follows: Mix into 100 parts by weight of ground inner tube scrap, or similar vulcanized rubber containing a minor proportion of pigments, 20 parts of p-toluene sulfonyl chloride, and subject the rubber-acid mixture in a compact mass to heat for 8 hours at 140° C. Upon cooling, the product may be masticated and washed. The resulting product is hard, remoldable at relative low temperatures. The admixture of 10 to 20 parts of crude rubber, either with or without 10 to 20 parts of rosin, into the comminuted scrap of the above recipe facilitates the dispersion of the acid reagent therethrough and results in a vastly superior product, both as to homogeneity and ease of remolding. The latter product is readily mixed with pigments, fibers, softeners and colors.

*Example II.*—As another example of a method for utilizing scrap rubber, 50 parts by weight of crude rubber are masticated on a rubber mill and 50 parts of ground scrap having a minor proportion of pigment are then worked into the crude-rubber. When well masticated, 10 parts of p-toluene sulfonyl chloride is added to this mixture on the mill and thoroughly dispersed therethrough. The rubber compound is then heated for 8 hours at 140° C. The resulting product is hard, friable, easily remoldable, and can be readily mixed with pigments, softeners, fibers and colors.

*Example III.*—Acid reclaimed rubber or ground vulcanized rubber scrap containing a considerable proportion of pigments, such as solid tire scrap or reclaim, or of both pigment and fiber, such as pneumatic tire casing scrap, may be reacted upon by a sulfonyl chloride, after being admixed with equal parts of crude rubber, to form a satisfactory thermoplastic composition. These pigment and fiber containing rubbers require a larger proportion of the acid reagent to effect the reaction, 20 to 25 parts by weight of p-toluene sulfonyl chloride to 100 parts by weight of the rubber and scrap mixture having been found to give satisfactory reaction products.

*Example IV*.—Alkali reclaimed rubber is reacted upon by the acid reagents less actively than acidized reclaim. A good thermoplastic product has been obtained by mixing 20 parts by weight of alkali reclaim into 80 parts of crude rubber, adding thereto 20 parts of p-toluene sulfonyl chloride and subjecting to heat for 10 hours at 140° C.

*Example V*.—As an illustration of the use of softening agents, mix 70 parts by weight of ground inner tube scrap, 15 parts of p-coumarone and 15 parts of raw rubber thoroughly, and add thereto 20 parts of p-toluene sulfonyl chloride, then subject the mix to heat at 140° C. for 10 hours. Other softeners, such as rosin, brown substitute, etc., may be used in place of the p-coumarone.

The products formed in any of the above indicated processes soften at relatively low temperatures, usually from 60 to 105° C., are easily remoldable and have a rather high degree of mechanical strength and a low dielectric constant. They are consequently particularly adapted for the manufacture of molded articles, such as radio dials, molded insulation, telephone receivers, battery jars, and the like.

While p-toluene sulfonyl chloride has been recited in the above examples, it is to be understood that other organic sulfonyl chlorides may be employed. Thus, benzene, naphthylene, p-phenol, nitrobenzene, and p-dichloro-benzene sulfonyl chlorides have been found to give satisfactory results in the processes of the present applications. The term "vulcanized rubber" is used in the claims broadly to include the so-called reclaimed rubbers. The term "cyclic" as employed in the claims hereof is intended to include generically organic compounds containing a closed ring.

The process above described may be varied in detail, particularly in the proportions of ingredients employed, through a wide range without departing from the principles of the invention and I therefore do not purpose wholly to limit the claims of this application to the specific examples herein recited.

I claim:

1. The method of producing heat-plastic products which comprises reacting at an elevated temperature para-toluene sulfonyl chloride with comminuted vulcanized rubber scrap under such conditions as to produce a heat-plastic product.

2. The method of producing heat-plastic products which comprises reacting at an elevated temperature para-toluene sulfonyl chloride with comminuted vulcanized inner tube scrap, or the like, under such conditions as to produce a heat-plastic product.

3. The method of producing heat-plastic products which comprises reacting at an elevated temperature an organic sulfonyl chloride with a mixture of comminuted vulcanized rubber scrap and crude rubber under such conditions as to produce a heat-plastic product.

4. The method of producing heat-plastic products which comprises reacting at an elevated temperature para-toluene sulfonyl chloride with a mixture of comminuted vulcanized rubber scrap and crude rubber under such conditions as to produce a heat-plastic product.

5. The method of producing heat-plastic products which comprises reacting at an elevated temperature an organic sulfonyl chloride with a mixture of comminuted vulcanized rubber scrap, crude rubber and a softener under such conditions as to produce a heat-plastic product.

6. The method of producing heat-plastic products which comprises reacting at an elevated temperature an organic sulfonyl chloride with a mixture of comminuted vulcanized rubber scrap, crude rubber and a rosin under such conditions as to produce a heat-plastic product.

7. The method of producing heat-plastic products which comprises reacting at an elevated temperature an organic sulfonyl chloride with a mixture of comminuted vulcanized rubber scrap and a softener therefor under such conditions as to produce a heat-plastic product.

8. The method of producing heat-plastic products which comprises reacting at an elevated temperature para-toluene sulfonyl chloride with a mixture of comminuted vulcanized rubber scrap with rosin under such conditions as to produce a heat-plastic product.

9. A reaction product of vulcanized rubber scrap and an organic sulfonyl chloride.

10. A reaction product of vulcanized rubber scrap and para-toluene sulfonyl chloride.

11. A reaction product of an organic sulfonyl chloride with a mixture of vulcanized rubber scrap and crude rubber.

12. A reaction product of an organic sulfonyl chloride with a mixture of vulcanized rubber scrap and crude rubber, and a rubber softener.

13. A reaction product of an organic sulfonyl chloride with a mixture of vulcanized rubber scrap and a rubber softener.

14. A reaction product of organic sulfonyl chloride with a mixture of vulcanized rubber scrap, crude rubber, and a rosin.

15. The method of producing a heat-plastic product which comprises heating vulcanized rubber in the presence of an aromatic sulfonyl chloride.

16. The method of producing a heat-plastic product which comprises incorporating an aromatic organic sulfonyl chloride with comminuted vulcanized rubber and heating the rubber mix to a reaction temperature.

17. The method of producing a heat-plastic product which comprises heating comminuted vulcanized rubber scrap in the presence of a sulfonyl chloride derivative of a cyclic hydrocarbon.

18. The method of producing a heat-plastic product which comprises mixing into vulcanized rubber an aromatic sulfonyl chloride and heating the resulting batch to a reaction temperature.

19. The method of producing a heat-plastic product which comprises incorporating a sulfonyl chloride derivative of a cyclic hydrocarbon with an admixture of vulcanized rubber scrap and crude rubber and heating the resulting batch to a reaction temperature.

20. The method of producing a heat-plastic product which comprises incorporating a sulfonyl chloride derivative of a cyclic hydrocarbon with a mixture of vulcanized rubber, crude rubber and a rubber softener, and heating the resulting batch to a reaction temperature.

21. The method of producing a heat-plastic product which comprises incorporating a sulfonyl chloride derivative of a cyclic hydrocarbon with vulcanized rubber scrap and a softener therefor, and heating the resulting batch to a reaction temperature.

22. A reaction product of an acid reagent comprising a sulfonyl chloride derivative of a cyclic hydrocarbon with vulcanized rubber scrap.

23. A reaction product of a mixture of vulcanized rubber scrap and crude rubber with a sulfonyl chloride derivative of a cyclic hydrocarbon.

24. A reaction product of a mixture of vulcanized rubber scrap, crude rubber and a rubber softener with a sulfonyl chloride derivative of a cyclic hydrocarbon.

In witness whereof I have hereunto set my hand this 27th day of October, 1925.

HAROLD GRAY.

CERTIFICATE OF CORRECTION.

Patent No. 1,745,926.                       Granted February 4, 1930, to

HAROLD GRAY.

It is hereby certified that error appears in the printed specification of the above numbered patent requiring correction as follows: Page 1, line 66, for the word "relative" read "relatively"; page 2, lines 58 and 59, claim 1, strike out the words "para-toluene sulfonyl ride" and insert instead "an organic sulfonyl chloride"; and that the said Letters Patent should be read with these corrections therein that the same may conform to the record of the case in the Patent Office.

Signed and sealed this 1st day of April, A. D. 1930.

M. J. Moore, product which comprises incorporating an aromatic organic sulfonyl chloride with comminuted vulcanized rubber and heating the rubber mix to a reaction temperature.

17. The method of producing a heat-plastic product which comprises heating comminuted vulcanized rubber scrap in the presence of a sulfonyl chloride derivative of a cyclic hydrocarbon.

18. The method of producing a heat-plastic product which comprises mixing into vulcanized rubber an aromatic sulfonyl chloride and heating the resulting batch to a reaction temperature.

19. The method of producing a heat-plastic product which comprises incorporating a sulfonyl chloride derivative of a cyclic hydrocarbon with an admixture of vulcanized rubber scrap and crude rubber and heating the resulting batch to a reaction temperature.

20. The method of producing a heat-plastic product which comprises incorporating a sulfonyl chloride derivative of a cyclic hydrocarbon with a mixture of vulcanized rubber, crude rubber and a rubber softener, and heating the resulting batch to a reaction temperature.

21. The method of producing a heat-plastic product which comprises incorporating a sulfonyl chloride derivative of a cyclic hydrocarbon with vulcanized rubber scrap and a softener therefor, and heating the resulting batch to a reaction temperature.

22. A reaction product of an acid reagent comprising a sulfonyl chloride derivative of a cyclic hydrocarbon with vulcanized rubber scrap.

23. A reaction product of a mixture of vulcanized rubber scrap and crude rubber with a sulfonyl chloride derivative of a cyclic hydrocarbon.

24. A reaction product of a mixture of vulcanized rubber scrap, crude rubber and a rubber softener with a sulfonyl chloride derivative of a cyclic hydrocarbon.

In witness whereof I have hereunto set my hand this 27th day of October, 1925.

HAROLD GRAY.

CERTIFICATE OF CORRECTION.

Patent No. 1,745,926.                     Granted February 4, 1930, to

HAROLD GRAY.

It is hereby certified that error appears in the printed specification of the above numbered patent requiring correction as follows: Page 1, line 66, for the word "relative" read "relatively"; page 2, lines 58 and 59, claim 1, strike out the words "para-toluene sulfonyl ride" and insert instead "an organic sulfonyl chloride"; and that the said Letters Patent should be read with these corrections therein that the same may conform to the record of the case in the Patent Office.

Signed and sealed this 1st day of April, A. D. 1930.

M. J. Moore,